(12) United States Patent
Hughes et al.

(10) Patent No.: US 8,572,889 B1
(45) Date of Patent: Nov. 5, 2013

(54) AERATED AND WATER CONDITIONED CONTAINER FOR LIVE BAIT

(76) Inventors: John J. Hughes, Monroe, MI (US); John H. Brancheau, Jr., Monroe, MI (US)

(*) Notice: Subject to any disclaimer, the term of this patent is extended or adjusted under 35 U.S.C. 154(b) by 374 days.

(21) Appl. No.: 13/046,183

(22) Filed: Mar. 11, 2011

(51) Int. Cl.
*A01K 97/00* (2006.01)

(52) U.S. Cl.
USPC .................................. 43/57; 43/56

(58) Field of Classification Search
USPC .................................. 43/57, 56, 55
See application file for complete search history.

(56) References Cited

U.S. PATENT DOCUMENTS

| | | | | |
|---|---|---|---|---|
| 2,587,834 A * | 3/1952 | Goode | | 43/57 |
| 2,772,867 A | 12/1956 | Cleckner | | |
| 3,191,337 A * | 6/1965 | Fant | | 43/57 |
| 3,217,444 A * | 11/1965 | Howard | | 43/57 |
| 3,711,986 A | 1/1973 | Anderson | | |
| 3,831,310 A | 8/1974 | Frangullie | | |
| 4,151,810 A | 5/1979 | Wiggins | | |
| 4,677,785 A | 7/1987 | Lambourn | | |
| 4,712,327 A * | 12/1987 | Ross et al. | | 43/57 |
| 4,757,636 A * | 7/1988 | Lambourn | | 43/57 |
| 4,945,672 A * | 8/1990 | Raia | | 43/57 |
| 5,267,410 A * | 12/1993 | Peyatt | | 43/57 |
| 5,799,435 A * | 9/1998 | Stafford | | 43/57 |
| 5,921,017 A * | 7/1999 | Clark et al. | | 43/57 |
| 6,962,019 B1 | 11/2005 | McDougle | | |
| 7,024,814 B1 * | 4/2006 | McDougle | | 43/57 |
| 2008/0028667 A1 | 2/2008 | Grzybowski | | |

* cited by examiner

*Primary Examiner* — Christopher P Ellis
(74) *Attorney, Agent, or Firm* — Montgomery Patent & Design; Robert C Montgomery

(57) ABSTRACT

A bait bucket with aerating and cooling functions is particularly adapted for use with live bait and includes an inner bucket, an outer bucket, and an insulated tube. A bottom exterior of the inner bucket includes a water cooling system which provides a cooling and an oxygenating function to the quantity of water contained within the inner bait bucket. The outer bucket includes a fan and a vent which provide circulation and additional cooling to water cooling system.

17 Claims, 8 Drawing Sheets

AERATED AND WATER CONDITIONED CONTAINER FOR LIVE BAIT

RELATED APPLICATIONS

The present invention was first described in a notarized Official Record of Invention on Mar. 26, 2010, that is on file at the offices of Montgomery Patent and Design, LLC, the entire disclosures of which are incorporated herein by reference.

FIELD OF THE INVENTION

The present invention relates generally to live bait receptacles, and in particular, to an aerated and water conditioned container for live bait to optimize a life span of the live bait.

BACKGROUND OF THE INVENTION

Many fishermen use an air pump or aerator in their livewell container. Such pumps inject air into the water to increase its oxygen level. This increased oxygen level allows fish or other live bait to remain alive for longer periods of time. This increased time is critical when transporting bait fish on longer duration fishing outings. However, another parameter which may affect the health of the bait even more so than oxygen levels is that of water temperature. The poor insulation capability of most bait containers coupled with long fishing times mean that many bait fish die of heat before succumbing to the lack of oxygen.

A common attempt to overcome this problem is the use of ice which is placed in contact with or around the live bait container or simply added to the live bait water. The use of ice has many disadvantages, particularly the lack of temperature control. Water achieving too low of a temperature can be as deadly to the bait fish as when the water is too high a temperature. Additionally, the use of ice can lead to cold pockets in the water which can put the bait fish into shock when they swim through that area. When ice is placed directly in the live bait water, the chemicals commonly found in ice can also be deadly to the live bait.

Various devices have attempted to overcome the disadvantages of simply packing the bait bucket in ice or adding ice to the water. Examples of these attempts can be seen by reference in several U.S. patents along with devices intended only to aerate the live bait water.

U.S. Pat. No. 2,772,867 issued to Cleckner discloses an aerator intended to introduce air into the water of a fish or bait tank in order to aerate the water and remove carbon dioxide. U.S. Pat. No. 3,217,444 issued to Howard discloses a live bait storing device also intended to provide water aeration powered by a self contained battery for maintaining the live bait fish in a healthy condition. U.S. Pat. No. 3,711,986 issued to Anderson discloses an aerated bait keeper having an inner bucket insertably fit within an outer bucket and an aerating tube to introduce oxygen into the water. U.S. Pat. No. 4,677,785 issued to Lambourn discloses an aerated live bait bucket also intended to introduce oxygen to the live bait water contained within the bucket. U.S. Pat. No. 5,921,017 issued to Clark et al. discloses a live bait transporter which provides aeration of the live bait water through an air bladder which bleeds air into the water when pressure is applied.

U.S. Pat. No. 3,831,310 issued to Frangullie discloses a live bait bucket having a plurality of chambers separated by partitions to keep the live bait separated and allows ice or hot water to be introduced as a temperature control as fluid flows between the chambers.

U.S. Pat. No. 4,151,810 issued to Wiggins discloses an aquarium with improved filter and temperature control system having a water filter compartment which contains a heart exchanger for heating or cooling water which is circulated between the filter compartment and the aquarium tank. U.S. Pat. No. 6,962,019 issued to McDougle discloses an enhanced filtration and water conditioning system for a bait tank having a water filtration unit and a refrigerant based heat exchanger to condition a quantity of water circulated through the filtration unit.

While these attempts may achieve their purported objective each suffers from one (1) or more disadvantage or deficiency related to design or utilization. Particularly, these attempts do not overcome the many of the disadvantages as described. Those attempts that may overcome these disadvantages utilize complicated temperature conditioning systems which are not suitable for convenient transportation during a fishing outing.

SUMMARY OF THE INVENTION

The inventor has therefore recognized the aforementioned inherent problems and lack in the art and observed that there is a need for a device in which both oxygen levels and temperature levels inside of a fishing bait container can be controlled in a manner so as to address the concerns as described above. In accordance with the invention, it is an object of the present disclosure to solve these problems.

The inventor recognized these problems and has addressed this need by developing an aerated and water conditioned container for live bait that provides the ability to keep fishing bait alive for longer periods of time in a manner which quick, easy, and effective and also enhances the overall fishing experience and success. The inventor has thus realized the advantages and benefits of providing a an outer bucket defining an interior chamber, an insulated tube insertingly fit within the outer bucket interior chamber, and an inner bucket defining an interior chamber to contain a volume of water and live bait which is insertingly fit within the insulated tube. A lid is removably attachable to the inner bucket. A water conditioning system is disposed between the inner bucket and the outer bucket and is in fluid communication with the volume of water to aerate and cool a circulating partial volume of water from the volume of water contained within the inner bucket interior chamber.

The water conditioning system includes a water block which is mounted to the inner bucket bottom surface. The water block has an inlet to receive the circulated partial volume of water and an outlet to dispense the circulating partial volume of water back into the inner bucket interior chamber. A thermoelectric heat pump is mounted below the water block to transfer heat from the water block. The thermoelectric heat pump has a cold side in contact with a bottom surface of the water block and a hot side opposite the cold side. A heat sink is mounted below the thermoelectric heat pump to dissipate heat from the thermoelectric heat pump. The heat sink has a base in contact with said thermoelectric heat pump hot side and a plurality of fins extending from the base. An inner fan is mounted below the plurality of fins to increase a heat dissipating flow of air over the fins. A water pump is in fluid communication between the inner bucket outlet, the inner bucket inlet, and the water block to circulate the circulating partial volume of water through a plurality of water tubes. An air pump is in fluid communication with at least one of the water tubes through an air tube for aerating the circulating partial volume of water. A power supply is provided for supplying electrical power to the water conditioning system.

Furthermore, the described features and advantages of the disclosure may be combined in various manners and embodiments as one skilled in the relevant art will recognize. The disclosure can be practiced without one or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
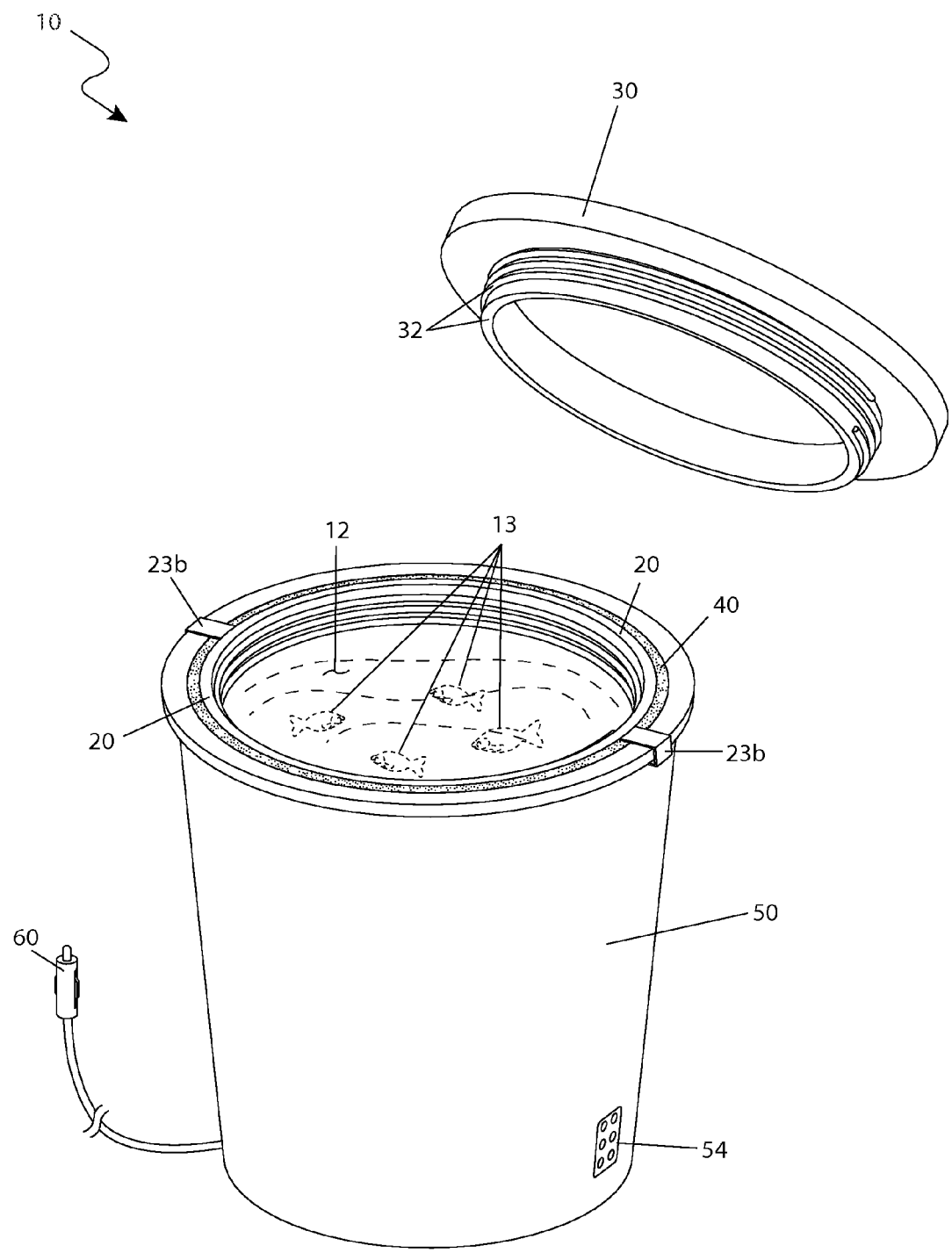
FIG. 1 is a perspective view of an aerated and water conditioned container for live bait, according to a preferred embodiment in accordance with the invention.

DESCRIPTIVE KEY 10 aerated and water conditioned container for live bait
12 water
13 live bait
14 cooling system
20 inner bucket
21 inner bucket interior surface
22 inner bucket bottom surface
23a inner bucket thread
23b securing handle
23c inner bucket outlet
23d inner bucket inlet
24a water block
24b water block cover
24c fastening bracket
24d aperture
24e nozzle
24f thermoelectric cooler
24g heat sink
24h inner fan
25a air pump
25b air pump outlet
26a water pump
26b water pump inlet
26c water pump outlet
27 "T"-fitting
28 air tube
29 water tube
30 lid
31 lid handle
32 lid thread
40 insulated tube
41 upper opening
42 lower opening
50 outer bucket
51 outer bucket interior surface
52 outer bucket bottom surface
53 lip
54 vent
55 aperture
56 outer fan
60 power source connector
61 electrical wiring
62 sealant

DETAILED DESCRIPTION OF THE PREFERRED EMBODIMENT

In accordance with the invention, the best mode is presented in terms of a preferred embodiment, herein depicted within FIGS. 1 through 7. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 8, depicting an aerated and water conditioned container for live bait (herein described as an "apparatus") 10, where like reference numerals represent similar or like parts. In accordance with the invention, the present disclosure describes a transportable storage container for live bait 13, such as those used in fishing or similar activates requiring a live lure. The apparatus 10 includes enhanced features such as an aerating, a cooling, and a ventilation means which enable the live bait 13 to stay alive for a longer amount of time.

Figure 2:
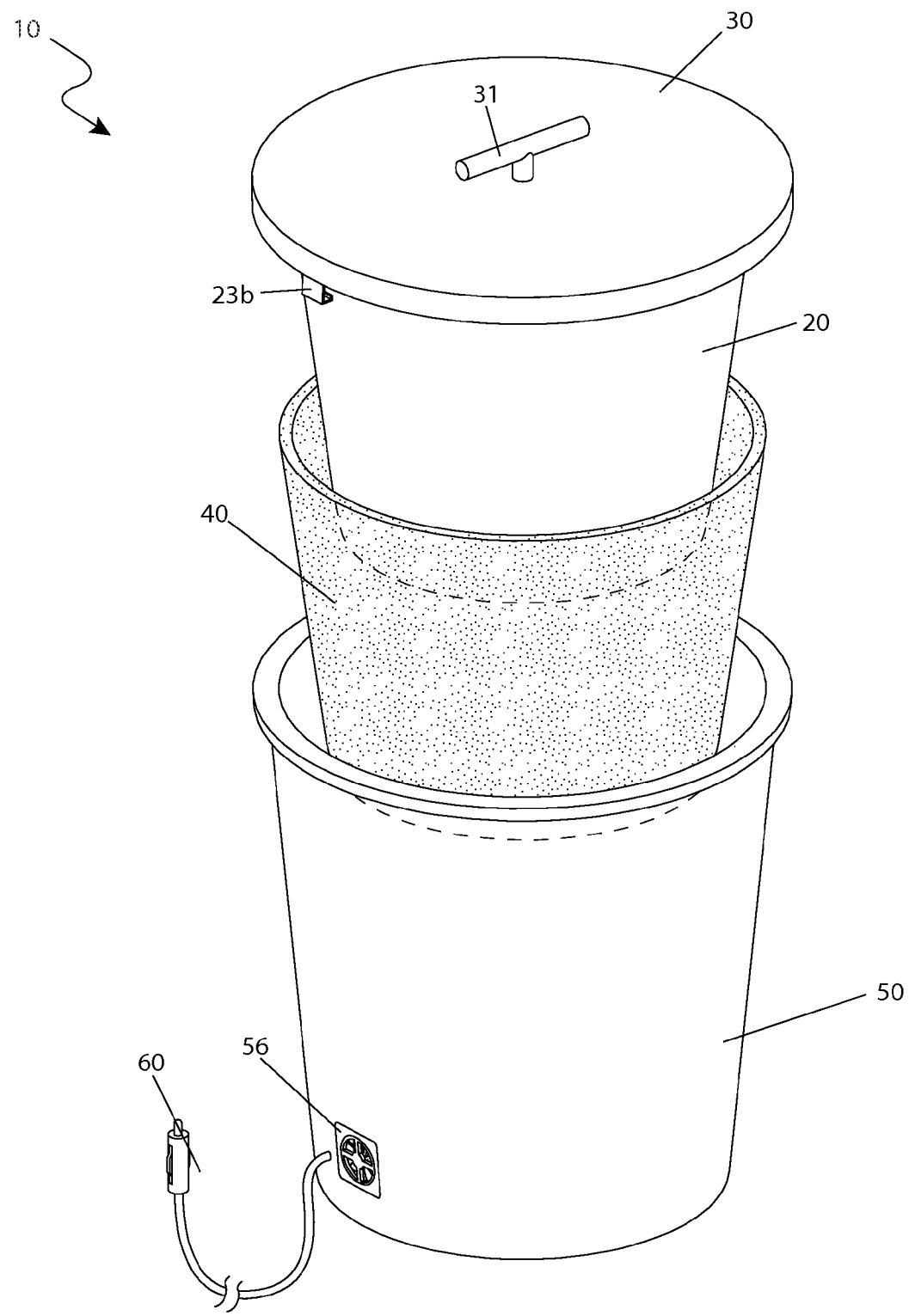
FIG. 2 is a partially exploded perspective view of the aerated and water conditioned container for live bait, according to the preferred embodiment.

FIG. 1 shows a perspective view of the apparatus 10 and FIG. 2 shows a partially exploded view of the apparatus 10. The apparatus 10 includes an inner bucket 20 (see also FIGS. 3 and 5), a lid 30, an insulated tube 40 (see also FIG. 6), and an outer bucket 50 (see also FIG. 7). FIG. 2 depicts the apparatus 10 in a partially exploded condition for illustration purposes only, it is understood that the apparatus 10 is intended to be manufactured as a single unit having the inner bucket 20, the insulated tube 40, and the outer bucket 50 adhered together or integrally molded as a unitary body.

The inner bucket 20 holds an amount of water 12 and a plurality of live bait 13, which can include minnows, shiners, or other aquatic live lure. The inner bucket 20 provides for the aerating and cooling conditioning of the water 12 for the benefit of to the live bait 13. This water conditioning allows the live bait 13 to survive within the apparatus 10 for a substantially longer period of time compared to a traditional bait bucket.

The lid 30 attaches to the inner bucket 20 to prevent the water 12 and live bait 13 from spilling out and to prevent contaminants from entering the inner bucket 20. The lid 30 has a general disc-shape and is threadably secured to an upper inner surface of the inner bucket 20. The lid 30 is preferably fabricated from materials such as, but not limited to: plastic, sheet metal, or the like. The lid 30 includes a lid handle 31 which provides a grip for the user to remove or attach the lid 30. The lid handle 31 is disposed at a center location and is depicted as including a "T"-shaped member, although other shapes may be utilized without limiting the scope of the apparatus 10. The lid handle 31 is preferably integrally molded onto an upper surface of the lid 30 through common plastic or metal manufacturing techniques. A bottom exterior of the lid 30 includes a lid thread 32 which matingly engages an inner bucket thread 23a formed on the upper interior surface of the inner bucket 20. The inner bucket thread 23a and lid thread 32 create an air tight seal when threadably mated which prohibits water 12 and live bait 13 from leaking. The inner bucket thread 23a is integrally molded into the upper surface of an inner bucket interior surface 21.

The insulated tube 40 provides for additional insulative cooling to the apparatus 10 by reducing the rate of heat transfer to maintain the water 12 at a desired temperature. The outer bucket 50 also assists in insulative cooling by retaining the inner bucket 20 and the insulated tube 40 in close contact. The apparatus 10 is preferably manufactured in various sizes to accommodate various user necessities. The apparatus 10 is preferably powered by a direct current (DC) power source connector 60 (see also FIG. 7).

Figure 3:
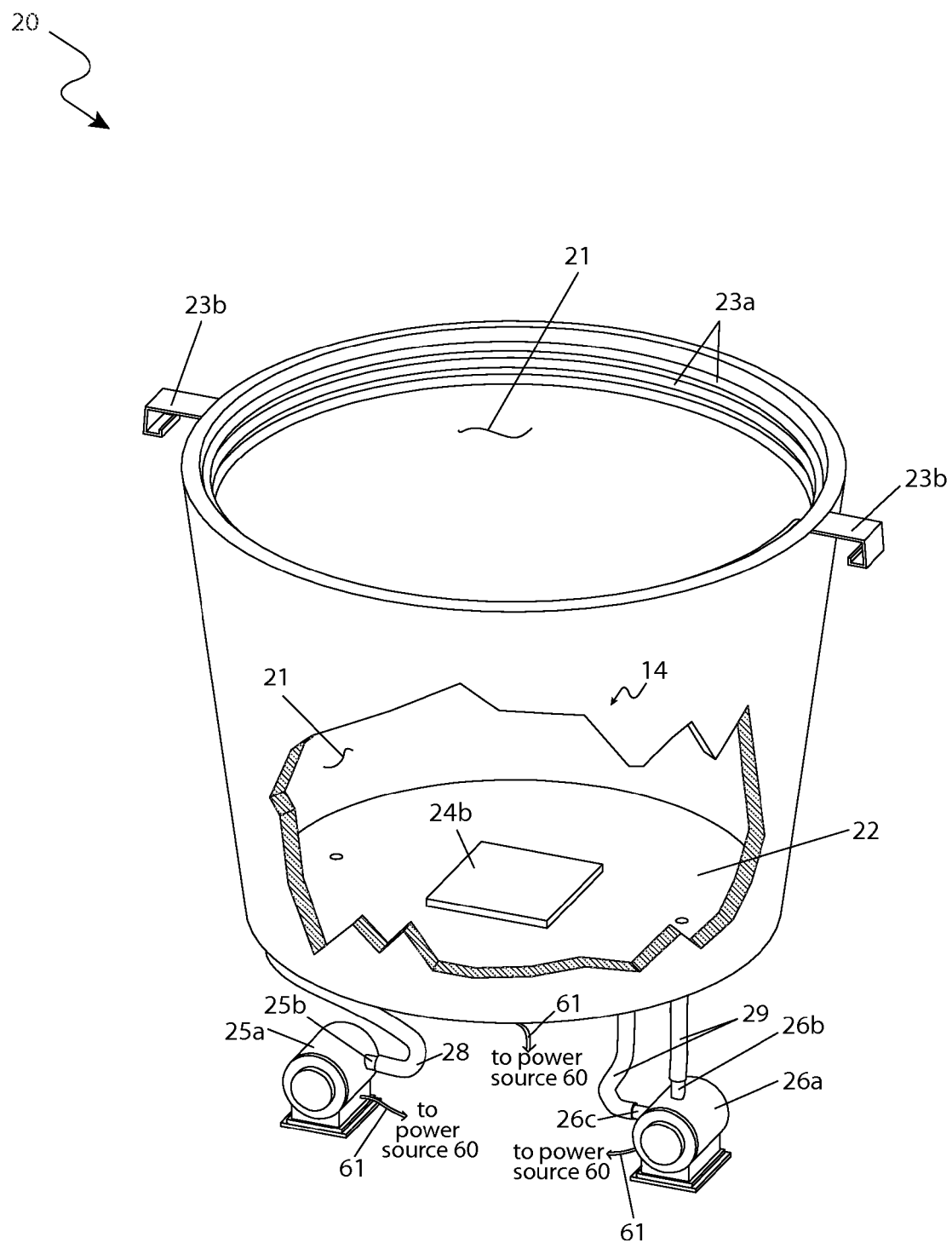
FIG. 3 is a cut-away view of an inner bucket, according to the preferred embodiment.
Figure 4:
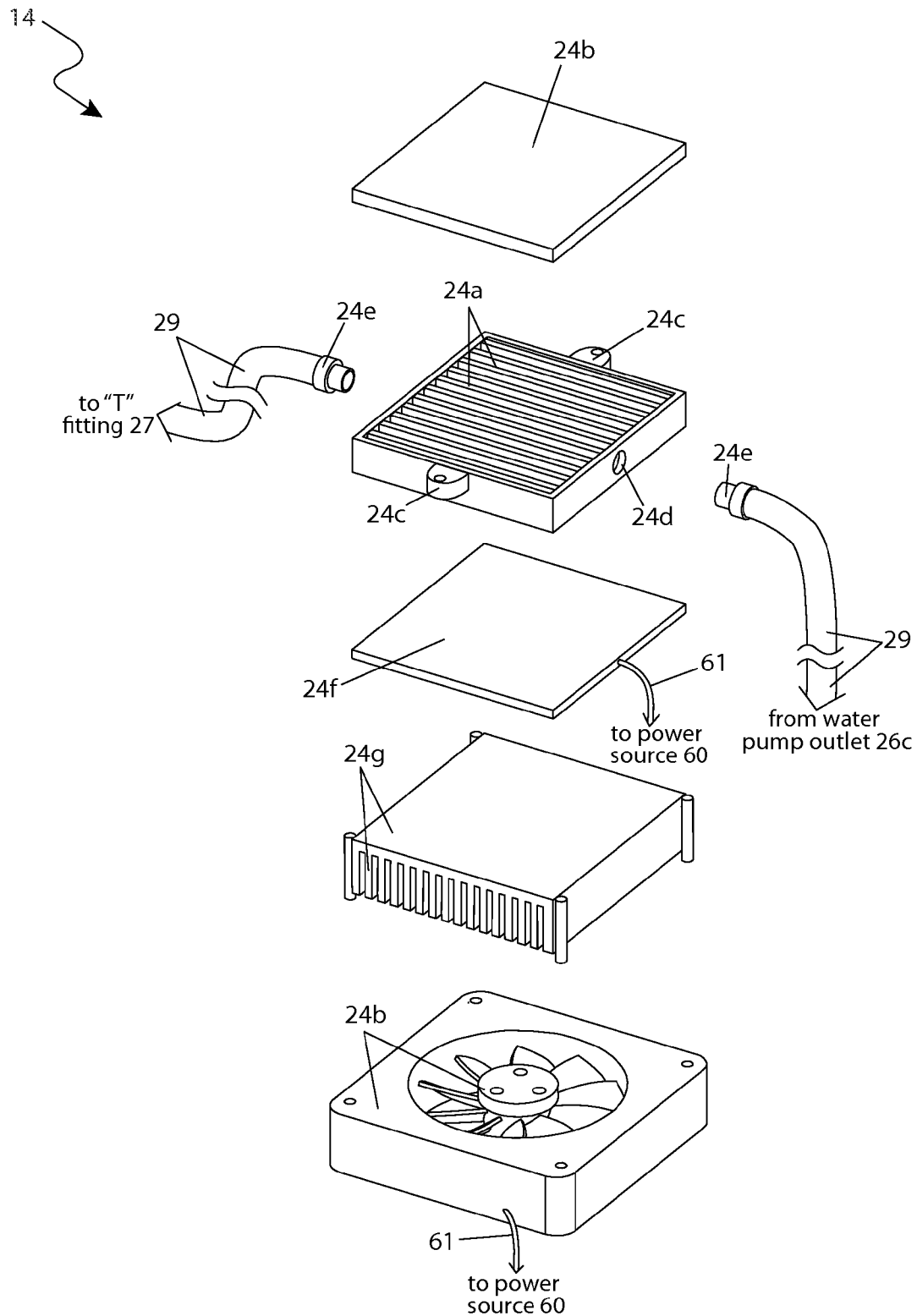
FIG. 4 is an exploded view of a cooling system, according to the preferred embodiment.
Figure 5:
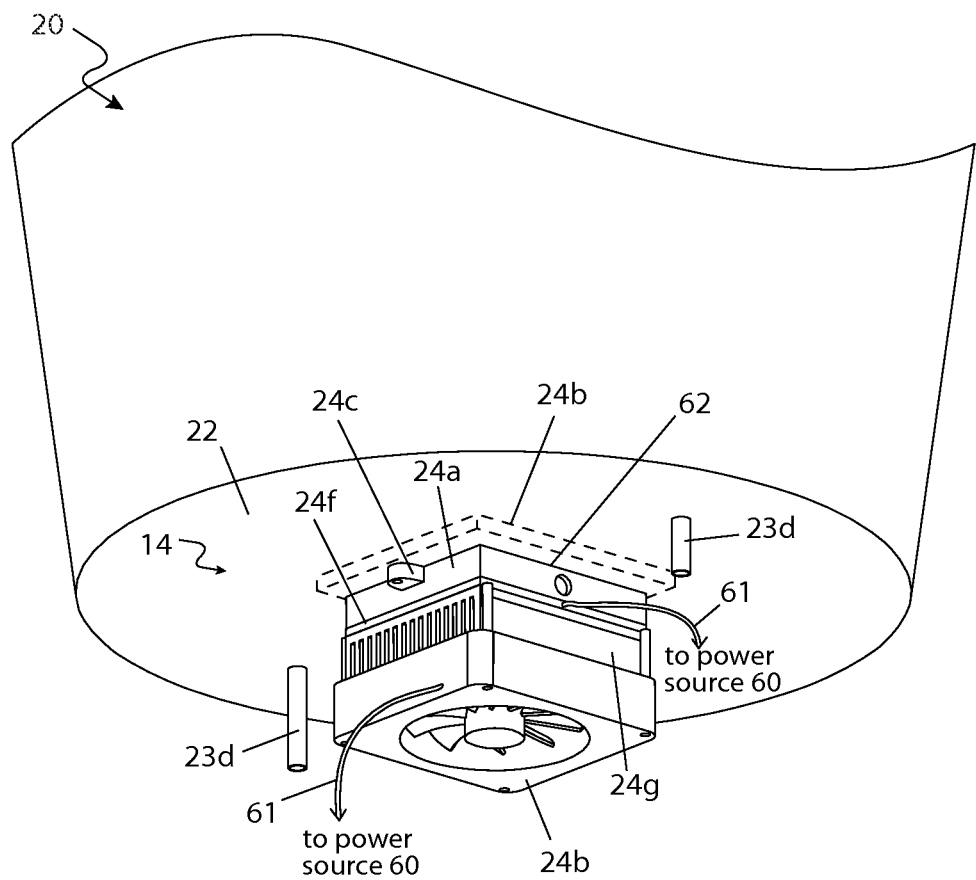
FIG. 5 is a bottom perspective view of the inner bucket, according to the preferred embodiment.
Figure 8:
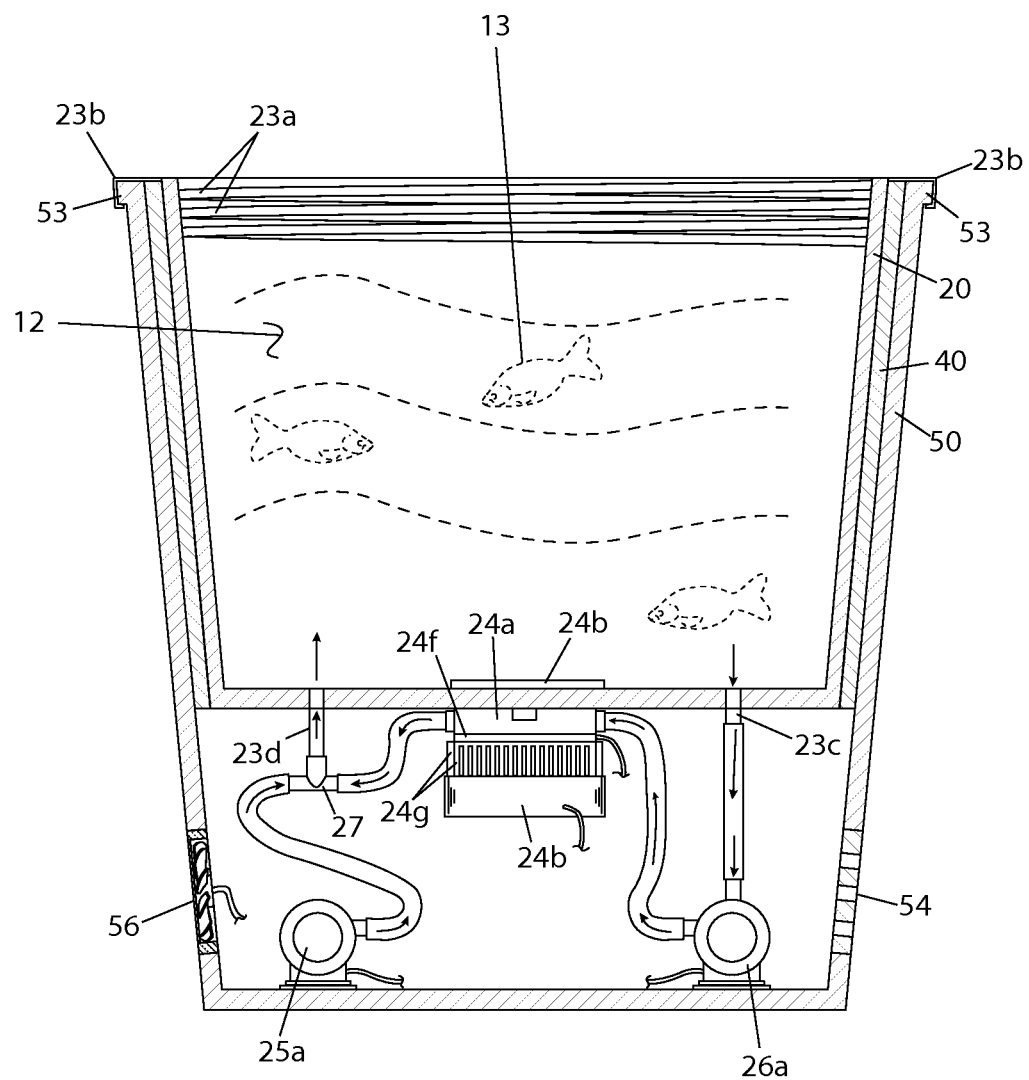

FIG. 3 shows a cut-away perspective view of the inner bucket 20, FIG. 4 shows an exploded view of the cooling system 14; FIG. 5 shows a bottom perspective view of the inner bucket 20; and, FIG. 8 shows a section view of the apparatus 10. The inner bucket 20 has a generally cylindrical shape with an open top and closed bottom surface 22. The inner bucket 20 is retained within the outer bucket 40 as shown in FIGS. 1 and 2. The inner bucket 20 has an outer diameter which is slightly smaller than the inner diameter of the insulated tube 40 which allows placement within. The inner bucket interior surface 21a is generally cylindrical in shape and the inner bucket bottom surface 22 is generally flat. The inner bucket 20 is preferably fabricated from materials similar to the lid 30.

The inner bucket bottom surface 22 provides a flat surface for attachment of the cooling system 14 which provides for the dissipation of heat from the water 12. The cooling system 14 includes a water block 24a, a thermoelectric cooler 24f, a heat sink 24g, and an inner fan 24h. The cooling system 14 cools the water 12 through conduction by dissipating heat away from the inner bucket 20. Water 12 is routed out of the inner bucket 20 through an inner bucket outlet 23c which is preferably a metal or plastic tubular fitting interconnected to a length of plastic water tubing 29 routed to a water pump 26a. The water pump 26a pumps water 12 out of the inner bucket 20 and into the cooling system 14. The water pump 26a is preferably a twelve volt direct current (12V DC) pump. It can be appreciated by one skilled in the art that similar water pumps or other commercial devices can be utilized without limiting the scope of the apparatus 10. The pump 26a is housed within the outer bucket 50. The water pump 26a is also interconnected by electrical wiring 61 to the power source connector 60 to receive electrical power during operation.

Water 12 enters the water pump inlet 26b and exits the water pump outlet 26c and flows into the water block 24a. Ends of the water tubes 29 are fitted with a nozzle 24e which is coupled to an aperture 24d disposed through the water block 24a. The nozzle 24e connects the water tube 29 to the water block 24a through the apertures 24d. The water block 24a provides a path for water 12 to flow through during the cooling process. A water block cover 24b is attached within the inner bucket 20 and the water block 24a is attached to an underside surface of the inner bucket bottom surface 22 by a pair of fastening brackets 24c. The fastening brackets 24c are fastened to the bottom surface 22 by mechanical fasteners, non-water soluble adhesives, material welding, or the like. The water block 24a is preferably sealed about an outer perimeter edge with a sealant 62, such as epoxy, to prevent leakage from the inner bucket 20. The water block 24a discharges cooled water 12 from another aperture 24d which is fitted with another nozzle 24e and a water tube 29 into a plastic or metal "T"-fitting 27.

The "T"-fitting 27 is also attached to a length of air tubing 28 which is received from an air pump outlet 25b on an air pump 25a. The air pump 25a oxygenates the water 12 and benefits the health of the live bait 13. The air pump 25a is preferably a twelve volt direct current (12V DC) air pump which is interconnected to the power source connector 60 by electrical wiring 61 and is also housed within the outer bucket 50. It can be appreciated by one skilled in the art that similar air pumps or other commercial devices can also be utilized without limiting the scope of the apparatus 10. The "T"-fitting 27 is also attached to an inner bucket inlet 23d which is similar to the inner bucket outlet 23c, yet the inlet 23d reintroduces cooled water 12 back into the inner bucket 20 through continuation of the water tube 29.

A thermoelectric cooler 24f is positioned subjacent to and draws heat away from the water block 24a. The thermo electric cooler 24f is preferably a Peltier cooler which utilizes the Peltier effect to create a heat flux between a junction of two (2) different materials. While a Peltier cooler is preferred, it can be appreciated that other types of solid state thermoelectric heat pumps can be utilized with equal effect. The thermoelectric cooler 24f is in physical contact with a base of the heat sink 24g. The heat sink 24g is below the thermoelectric cooler 24f and dissipates the heat generated by the hot side of the thermoelectric cooler 24f. An inner fan 24h is mounted below the fins of the heat sink 24g to increase the air flow over the heat sink fins to more efficiently dissipate heat. The inner fan 24h is preferably a brushless DC fan, yet other air circulation devices can be utilized with equal effect without limiting the scope of the apparatus 10. The heat sink 24g preferably has an internally threaded aperture at each corner to receive a fastener in order to connect the inner fan 24h below the fins. The thermoelectric cooler 24f and the inner fan 24h are preferably interconnected to the power source connector 60 by the electrical wiring 61.

Thus the water cooling cycle includes the warmer water entering the water block 24a and being routed through the internal channels. The cold side of the thermoelectric cooler 24f is placed in physical contact with the underside of the water block 24a. The cold side of the thermoelectric cooler 24f cools the water as it passed though the water block 24a from the inlet aperture to the outlet aperture. The heat sink 24g dissipates the heat from the hot side of the thermoelectric cooler 24f. The inner fan 24h transfers the flow of air surrounding the heat sink 24g to further reduce the temperature.

An upper exterior perimeter edge of the inner bucket includes a pair of opposing securing handles 23b which engage overtop of an upper perimeter edge of the outer bucket 50. Each securing handles 23b are integrally molded into the inner bucket 20 and have a generally downwardly curved shape that engages over the upper perimeter edge of the outer bucket 50 (see FIG. 1) for attachment purposes.

Figure 6:
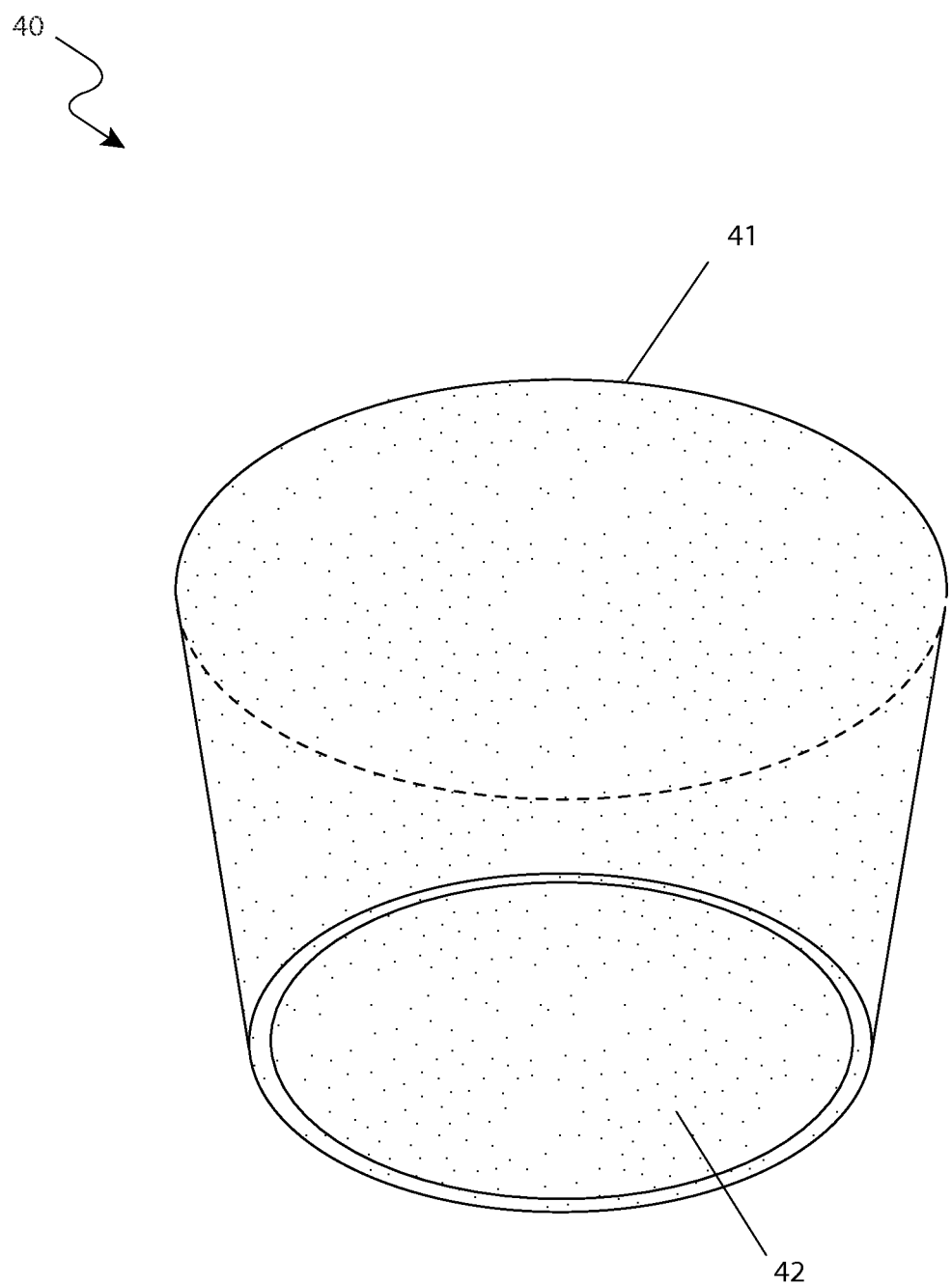
FIG. 6 is a bottom perspective view of an insulated tube, according to the preferred embodiment.

FIG. 6 shows a bottom perspective view of the insulated tube 40. The insulated tube 40 has a slightly tapered shape and includes an open top and an open bottom. The inner diameter of the insulated tube 40 is slightly larger than the outer diameter of the inner bucket 20 and slightly smaller than the inner diameter of the outer bucket 50, such that the insulated tube 40 fits between the inner bucket 20 and the outer bucket 50. An upper opening 41 of the insulated tube 40 receives the inner bucket 20. A lower opening 42 of the insulated tube 40 provides access for routing of the electrical wiring 61 and associated components. The insulated tube 40 is fabricated from materials such as, but not limited to: plastic foam, fiberglass, or the like.

Figure 7:
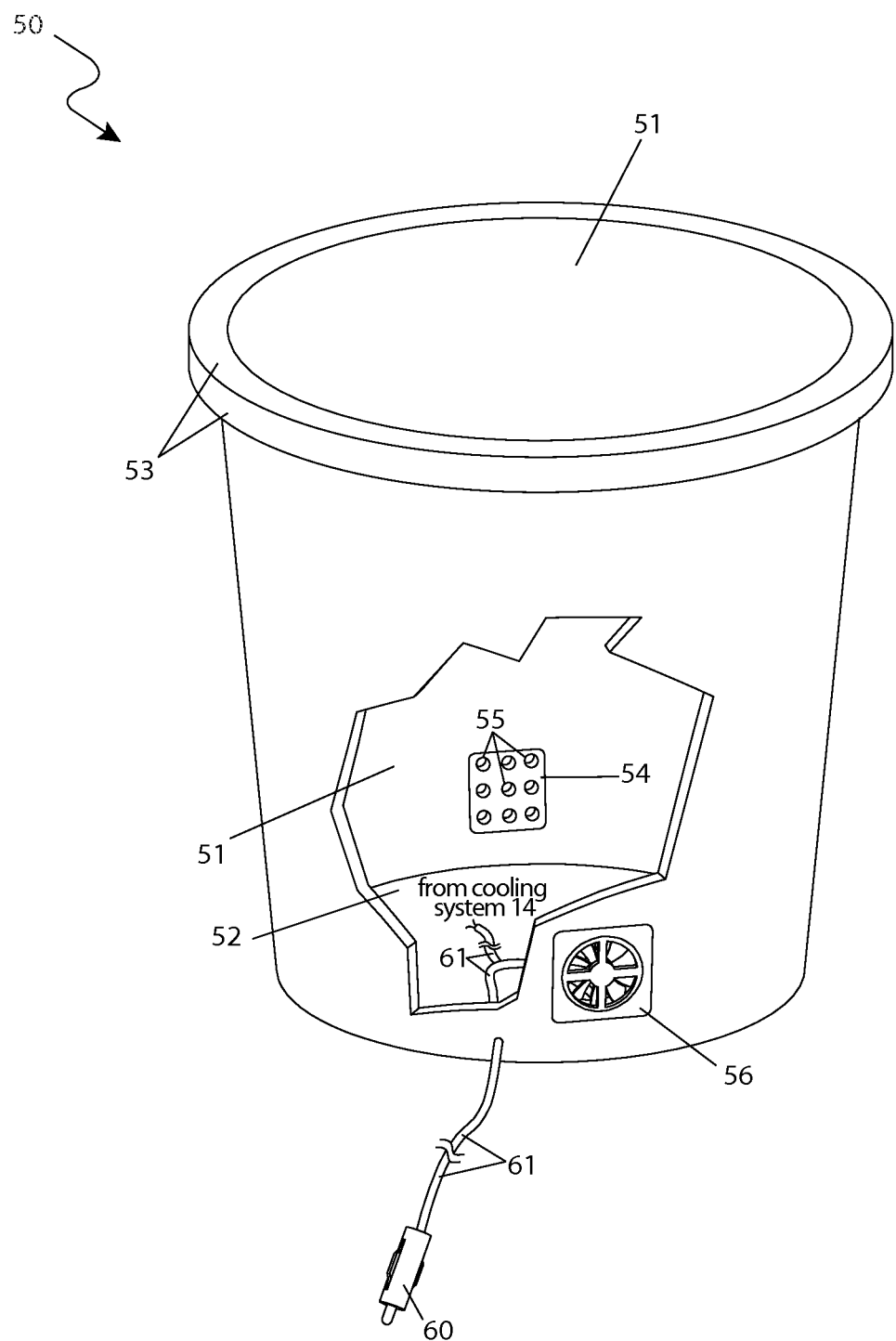
FIG. 7 is a cut-away perspective view of an outer bucket, according to the preferred embodiment; and, FIG. 8 is a section view of the aerated and water conditioned container for live bait depicting the major functional components, according to the preferred embodiment.

FIG. 7 shows a cut-away perspective view of the outer bucket 50. The outer bucket 50 has a generally cylindrical shape with slightly tapered sidewalls having an open top. The outer bucket 50 receives a combination of the inner bucket 20 and insulated tube 40 as shown in FIGS. 1, 2, and 8. The outer bucket 50 also includes an outer bucket interior surface 51 and a generally flat outer bucket bottom surface 52. An upper exterior perimeter surface includes a generally annular lip 53 for securing handles 23b to grip over. The lip 53 also provides an outwardly protruding ledge for the user to grasp during transportation of the apparatus 10. The outer bucket 50 is preferably substantially larger on a longitudinal axis than the inner bucket 30 and insulated tube 40. This extra length provides an open area between the inner bucket bottom surface 22 and the outer bucket bottom surface 52. The water pump 26a, the air pump 25a, water tubes 29, and air tube 28 are stored within this open area. The inner fan 24h is also directed to exhaust the warm air from the heat sink 24g into the open area. The outer bucket 50 is preferably fabricated from materials similar to the lid 30.

A side surface of the outer bucket 50 includes a vent 54 which provides an opening for a flow of air to enter or exit the open area of the outer bucket 50 to dissipate heat and circulate the air. The vent 54 includes a rectangular shape and includes a matrix of apertures 55 to assist in the circulation of the air. The vent 54 is integrally molded into the outer bucket 50.

Opposing the vent 54 is an outer fan 56 provides an air pressure to force air in to or out from the open space of the outer bucket 50. The outer fan 56 is affixed within an opening in the outer bucket 50 and is preferably a brushless DC fan. Electrical wiring 61 interconnects the outer fan 56 and a cooling system 14 (see FIG. 3 through 5) to the power source connector 60. The power source connector 60 is preferably an electrical adapter which is electrically connected to a twelve volt DC (12V DC) power supply within vehicles, yet other power sources may be utilized without limiting the scope of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; removing the lid 30 from the inner bucket 20 via grasping the handle 31 and disengaging the lid thread 32 from the inner bucket threading means 23; filling the inner bucket 20 with a desired amount of water 12 and live bait 13; installing the lid 30 onto the inner bucket 20 via engaging the lid thread 32 to the inner bucket threading means 23; transporting the apparatus 10 to a vehicle and inserting the power source connector 60 into the vehicles adapter; enabling current to power the cooling apparatus 14 to cool the water 12, operate the air pump 25a to oxygenate the water 12, operate the water pump 26a to circulate the water 12, and operate the fans 24h, 56 to circulate the air; and, providing the ability to keep live bait 13 alive for longer periods of time in a manner which is not only quick, easy, and effective, but enhances the fishing or other similar sport experience as well.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An aerated and water conditioned container for live bait, said container comprising:
    an outer bucket;
    an insulated tube insertingly fit within said outer bucket;
    an inner bucket insertingly fit within said insulated tube to contain a volume of water and said live bait; and,
    a water conditioning system to aerate and cool a circulating partial volume of water from said volume of water, comprising:
        a water block mounted to said inner bucket having a water block inlet to receive said circulating partial volume of water and a water block outlet to dispense said circulating partial volume of water;
        a thermoelectric heat pump mounted below said water block to transfer heat from said water block, said thermoelectric heat pump having a cold side in contact with a bottom surface of said water block and a hot side opposite said cold side;
        a heat sink mounted below said thermoelectric heat pump to dissipate heat from said thermoelectric heat pump, said heat sink having a base in contact with said thermoelectric heat pump hot side and a plurality of fins extending from said base;
        an inner fan mounted below said plurality of fins to increase a heat dissipating flow of air over said fins;
        a water pump in fluid communication between an inner chamber of said inner bucket and said water block to circulate said circulating partial volume of water through a plurality of water tubes;
        an air pump in fluid communication with at least one water tube through an air tube for aerating said circulating partial volume of water; and,
        a power connector electrically connected to a power source for supplying electrical power to said water conditioning system.

2. The container of claim 1, wherein said inner bucket further comprises an open top, a closed bottom, and a sidewall defining an interior chamber to contain said volume of water.

3. The device of claim 2, wherein said inner bucket further comprises an outlet and an inlet disposed through said inner bucket bottom and in fluid communication with said water pump through said plurality of water tubes.

4. The container of claim 1, wherein said outer bucket further comprises an open top, a closed bottom, and a sidewall defining an interior chamber to contain said inner bucket and said insulated tube;
    wherein said outer bucket further comprises a longitudinal dimension larger than said inner bucket, such that an open space is defined between said inner bucket and said outer bucket.

5. The device of claim 4, wherein said water pump, said air pump, said plurality of water tubes, and said air tube are disposed within said outer bucket open space.

6. The container of claim 5, wherein said outer bucket further comprises a vent disposed through said sidewall allowing for an exhaust flow of air in to and out from said outer bucket open space.

7. The container of claim 6, wherein said outer bucket further comprises an outer fan disposed through said sidewall opposite said vent to increase said exhaust flow of air in to and out from said outer bucket open space.

8. The container of claim 2, wherein said water conditioning system is in fluid communication with said inner bucket interior chamber.

9. The container of claim 2, further comprising a lid removably attachable to said inner bucket.

10. The container of claim 9, wherein said lid is threadingly attached to an interior of said inner bucket sidewall.

11. The container of claim 2, wherein said insulated tube further comprises a thermally insulative material.

12. The container of claim 11, wherein said thermoelectric heat pump further comprises a Peltier cooler.

13. An aerated and water conditioned container for live bait, said container comprising:
   an outer bucket defining an interior chamber;
   an insulated tube insertingly fit within said outer bucket interior chamber;
   an inner bucket defining an interior chamber to contain a volume of water and said live bait insertingly fit within said insulated tube, comprising an outlet and an inlet disposed through a bottom surface thereof;
   a lid removably attachable to said inner bucket; and,
   a water conditioning system disposed between said inner bucket and said outer bucket and in fluid communication with said volume of water to aerate and cool a circulating partial volume of water from said volume of water, comprising:
      a water block mounted to said inner bucket bottom surface having a water block inlet to receive said circulating partial volume of water and a water block outlet to dispense said circulating partial volume of water;
      a thermoelectric heat pump mounted below said water block to transfer heat from said water block, said thermoelectric heat pump having a cold side in contact with a bottom surface of said water block and a hot side opposite said cold side;
      a heat sink mounted below said thermoelectric heat pump to dissipate heat from said thermoelectric heat pump, said heat sink having a base in contact with said thermoelectric heat pump hot side and a plurality of fins extending from said base;
      an inner fan mounted below said plurality of fins to increase a heat dissipating flow of air over said fins;
      a water pump in fluid communication between said inner bucket outlet, said inner bucket inlet, and said water block to circulate said circulating partial volume of water through a plurality of water tubes;
      an air pump in fluid communication with at least one water tube through an air tube for aerating said circulating partial volume of water; and,
      a power supply for supplying electrical power to said water conditioning system.

14. The container of claim 13, wherein said outer bucket further comprises a vent disposed through a sidewall allowing for an exhaust flow of air in to and out from said outer bucket open space.

15. The container of claim 14, wherein said outer bucket further comprises an outer fan disposed through said sidewall opposite said vent to increase said exhaust flow of air in to and out from said outer bucket open space.

16. The container of claim 15, wherein said power supply further comprises a connector electrically connected to a power source.

17. A method of aerating and conditioning a volume of water to optimize a life span of live bait, said method comprising the steps of:
   providing said volume of water;
   providing a plurality of said live bait;
   providing an aerated and water conditioned container for live bait comprising an outer bucket defining an interior chamber, an insulated tube insertingly fit within said outer bucket interior chamber, an inner bucket defining an interior chamber to contain said volume of water and said live bait insertingly fit within said insulated tube, a lid removably attachable to said inner bucket, and a water conditioning system comprising a water block mounted to said inner bucket having an inlet to receive said circulating partial volume of water and an outlet to dispense said circulating partial volume of water, a thermoelectric heat pump mounted below said water block to transfer heat from said water block, said thermoelectric heat pump having a cold side in contact with a bottom surface of said water block and a hot side opposite said cold side, a heat sink mounted below said thermoelectric heat pump to dissipate heat from said thermoelectric heat pump, said heat sink having a base in contact with said thermoelectric heat pump hot side and a plurality of fins extending from said base, an inner fan mounted below said plurality of fins to increase a heat dissipating flow of air over said fins, a water pump in fluid communication between an inner chamber of said inner bucket and said water block to circulate said circulating partial volume of water through a plurality of water tubes, an air pump in fluid communication with at least one water tube through an air tube for aerating said circulating partial volume of water, and a power connector electrically connected to a power source for supplying electrical power to said water conditioning system; and,
   energizing said water conditioning system, such that said circulating volume of water is drawn from said volume of water;
   cooling said circulating partial volume of water;
   aerating said circulating partial volume of water; and,
   returning said circulated partial volume of water to said volume of water.

\* \* \* \* \*